United States Patent [19]

Black

[11] 4,126,181
[45] Nov. 21, 1978

[54] METHOD AND APPARATUS FOR FORMATION FRACTURING WITH FOAM HAVING GREATER PROPPANT CONCENTRATION

[75] Inventor: Donald S. Black, Edmonton, Canada

[73] Assignee: Palmer Engineering Company Ltd., Edmonton, Canada

[21] Appl. No.: 808,276

[22] Filed: Jun. 20, 1977

[51] Int. Cl.$^2$ ............................................. E21B 43/26
[52] U.S. Cl. ................................. 166/280; 166/75 R; 166/53; 166/177; 166/308
[58] Field of Search .............. 166/308, 280, 259, 271, 166/281, 283, 75, 177

[56] References Cited

U.S. PATENT DOCUMENTS

| 3,136,361 | 9/1964 | Marx | 166/308 |
|---|---|---|---|
| 3,138,205 | 6/1964 | Kerver | 166/280 |
| 3,245,470 | 4/1966 | Henry | 166/280 |
| 3,363,691 | 1/1965 | Gomory | 166/280 |
| 3,396,107 | 8/1968 | Hill | 166/308 |
| 3,483,121 | 12/1969 | Jordan | 166/308 X |
| 3,664,422 | 5/1972 | Bullen | 166/308 X |
| 3,842,910 | 10/1974 | Zingg et al. | 166/308 X |
| 3,846,560 | 12/1969 | Hutchison et al. | 166/308 X |
| 3,937,283 | 2/1976 | Blauer | 166/308 X |
| 3,980,136 | 9/1976 | Plummer | 166/280 |

OTHER PUBLICATIONS

Bullen, "Oilweek" Jul. 22, 1974, "Fracturing Technique Developed Using Unique Stable Foam Properties," pp 50, 52.

Primary Examiner—Stephen J. Novosad
Attorney, Agent, or Firm—Larson, Taylor and Hinds

[57] ABSTRACT

The amount of proppant in a formation fracturing foam is significantly increased by the disclosed method and apparatus.

18 Claims, 8 Drawing Figures

METHOD AND APPARATUS FOR FORMATION FRACTURING WITH FOAM HAVING GREATER PROPPANT CONCENTRATION

FIELD OF THE INVENTION

The present invention relates to the production and use of a hydraulic fracturing foam for subterranean formations and more particularly to the method and apparatus for increasing the amount of proppant in the foam.

BACKGROUND OF THE INVENTION

Various methods are well known to stimulate production of crude oil and natural gas from wells drilled in reservoirs of low permeability, although emphasis has been placed on hydraulically fracturing such formations with various liquids, such as native crude oil, with or without propping agents, such as sand, suspended therein. The hydraulic pressure applied to such low permeable formations creates tensile stresses in the rock of the formation surrounding the well bore and these stresses causing splitting, parting or fracturing of the rock. The initially formed fractures or channels are then extended by the injection of fluids containing propping agent to be deposited in the fractures. When the pressure is released, the propping agent deposited in the fractures hold the fractures open, leaving channels for reservoir fluid flow. The concentration of propping agent in the fluid is of significance because it determines the final thickness of the fractures. Typical prior art references disclosing such techniques include the following U.S. patents: Bullen, U.S. Pat. No. 3,664,422; McKinnel, U.S. Pat. No. 3,561,533; Gomory, U.S. Pat. No. 3,363,691; Marx, U.S. Pat. No. 3,136,361; Zingg et al., U.S. Pat. No. 3,842,910; Henry, U.S. Pat. No. 3,245,470; Trott, U.S. Pat. No. 2,859,821; and Kerver et al., U.S. Pat. No. 3,138,205.

Hydraulic fracturing with foam, however, is only a recent development. A process using a foam composition to fracture is disclosed in the Blauer et al. U.S. Pat. No. 3,937,283, in an article by Bullen appearing in the July 22, 1974 issue of "Oilweek" and a paper by Blauer and Kohlhaas entitled "Formation Fracturing with Foam" SPE 5003. These documents disclose a making of a fracturing foam by blending sand into jelled water and treating the slurry with a surfactant. The fluid pressure is increased with a conventional pump after which a gas, such as nitrogen or carbon dioxide, is injected into the fluid at which point a high pressure foam is created. This foam is then injected into the well.

The use of a foam as a fracturing fluid has a number of advantages. The foam has a low fluid loss and hence the fracture treatment is more efficient and since larger-area fractures are created with the same treatment volume, formation damage is minimized because little fluid invades the formation. Reduction of fracture conductivity is also minimized. Theoretically, the foam has a high sand-carrying and sand-suspending capability whereby a greater amount of sand will remain suspended in the fluid until the fracture starts to heal. Because more sand can be carried to the fracture, the propped fracture area to the created fracture area ratio theoretically approaches one. In addition, the sand does not settle quickly in the well bore during unplanned shut-downs during the treatment. The foam has a high effective viscosity permitting the creation of wider vertical fractures and horizontal fractures having greater area. The foam has a low friction loss which reduces the hydraulic horsepower necessary for injection and permits treatment of many wells down tubing. Since the foam has a low liquid content, the hydraulic horsepower necessary for injection is reduced which results in low hydrostatic head which, in turn, results in an underbalanced condition soon after opening the well thereby minimizing fluid entry and formation damage. Due to essentially zero fluid leakoff, a greater increase length of hydraulic fracture penetration into the formation is possible. Experience has shown that the cost of using foam for moderately deep wells is less than or the same as conventional techniques.

Unfortunately, the cost for using foam produced pursuant to the prior art has at least one major handicap, namely, the maximum proppant concentration obtainable is quite low. Conventional hydraulic fluids can achieve sand concentrations of 6 to 8 lbs. of sand per gallon of carrying fluid. Typical figures for concentration of proppant during the formation of the foam using a method taught in the Blauer et al patent includes a heavy gel with a maximum concentration of 6 to 8 lbs. of proppant per gallon of gel. However, when the liquid is foamed, the gas expands the liquid to approximately four times the original volume of gel. The net result is that the sand-foam concentration is reduced to about 2 lbs. per gallon. As a result, the conventional foam process is not as useful to industry as it could be.

Most of the conventional methods of fracturing use sand as a propping agent because of its availability, its low cost, ability to easily grade and size the sand particles, its chemical stability, its low interference with well activity, and its ability when in the crevices to withstand the tremendous pressures from the overburden when the fluid pressure is relieved. However, sand is also a highly abrasive substance and consequently specially designed equipment must be used. Rugged pumps and tanks are now available which can inject slurries with sand-fluid ratios as high as 9 lbs. per gallon. However, this concentration of sand is insufficient to provide a foam fracturing fluid that has the desired concentration of sand or propping agent. Because of the difficulty of pumping and otherwise handling large quantities and large flow rates of sand slurries, it is not possible to increase the initial sand concentration to much greater than 8 lbs. per gallon. Thus, there is a great need and a large demand for a foam fracturing fluid that has a high concentration of sand or other propping agent and a means for introducing the fracturing fluid at the high well head pressures required to cause fracturing.

SUMMARY OF THE INVENTION

The present invention provides a method for producing a fracturing foam fluid with higher concentrations of proppant than were previously achievable. The present invention achieves a foam having up to twice the proppant concentration as that presently obtainable from conventional approaches. Accordingly, it is an object of this invention to provide a fluid composition of matter and a process for using that composition to fracture, extend an existing fracture, or otherwise stimulate flow, drainage and productivity of subterranean formations.

To accomplish the above and other objectives, the present invention provides a process for producing a foam fluid having a high concentration of proppant. The present invention generally comprises a method of making a foam for treating a subsurface earth formation penetrated by a well bore and the treatment of the earth formation. The method comprises generally the steps of blending a proppant with a foamable carrier thereby forming a slurry, and pressurizing the slurry to a desired pressure depending on the well depth, the geological area, the type of earth formation, and other injection criteria. The pressurized slurry or a part of it is then introduced into a centrifugal separator for separating out some of the carrier and thereby concentrating the amount of proppant per volume of slurry. An amount of the carrier is removed from the separator per volume of slurry until the desired proppant concentration is obtained in the concentrated slurry and the concentrated slurry is discharged from the separator. At some stage prior to the formation of foam, a surfactant is added to the mixture. Upon the addition of pressurized gas to the discharged, concentrated slurry, a pressurized foam is formed.

A separator for concentrating the slurry according to the present invention comprises a substantially horizontally extending vessel having a slurry intake at a forward end and a concentrated slurry discharge and a carrier discharge at the rearward end. A rotor rotatably mounted inside the vessel and rotated by a motor defines a concentric channel between the vessel and the rotor. The rotor comprises a substantially cylindrical stabilizer at the forward end thereof for imparting a spin to the incoming slurry, a plurality of intake propellers downstream of the stabilizer, and a plurality of discharge impellers spaced downstream from the intake impellers. An internal passageway connects the intake impellers to the discharge impellers.

The foregoing method and apparatus has all the desirable properties for producing a significantly more proppant-concentrated slurry than that produced by conventional methods. The present method can use conventional apparatus including a conventional cyclone separator or can use a separator as disclosed herein.

These and other features and advantages of the present invention will be set forth in or apparent from the detailed disclosure of the preferred embodiments hereinbelow.

DETAILED DESCRIPTION OF THE PRESENTLY PREFERRED EMBODIMENTS

Figure 1:
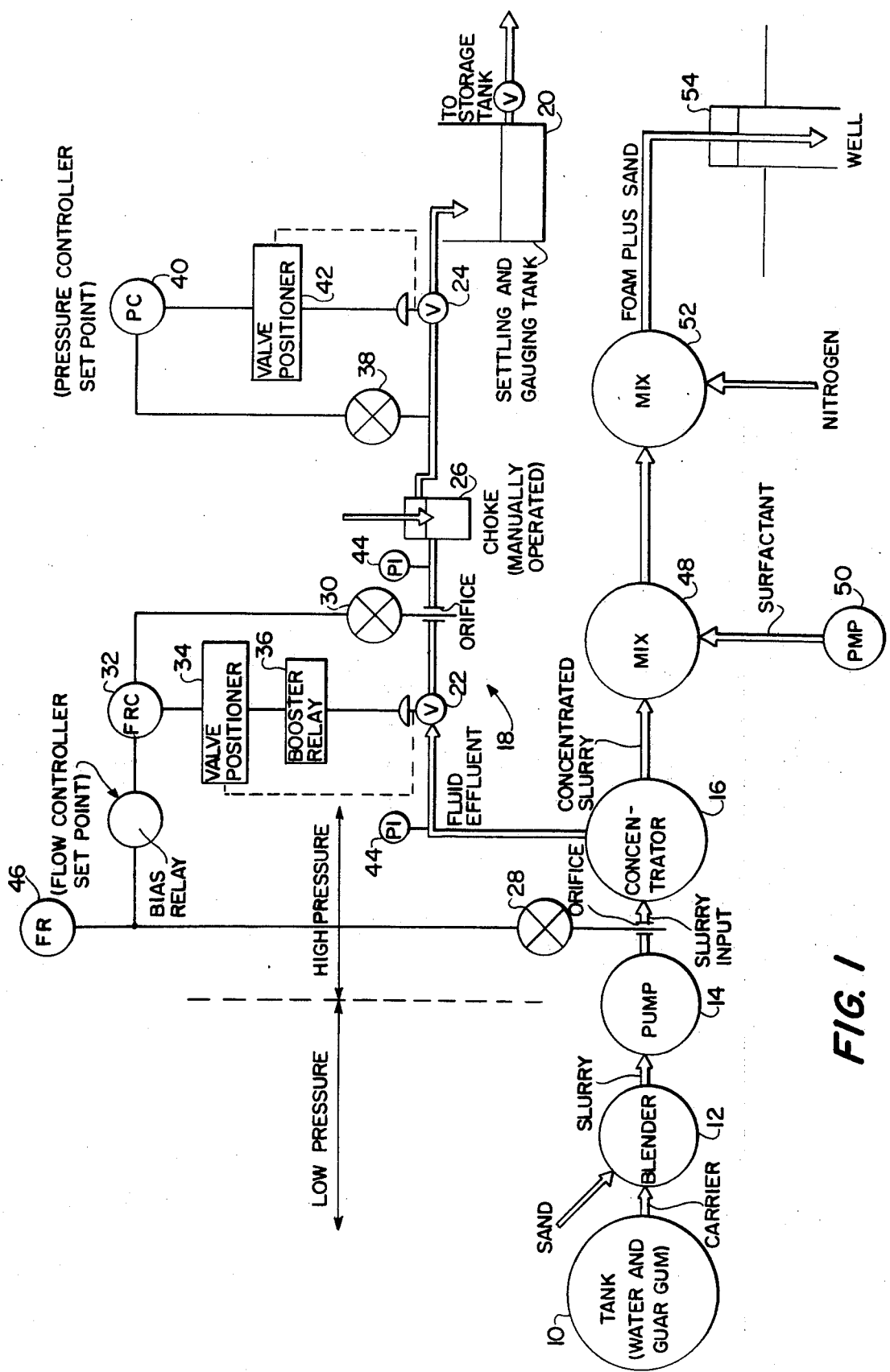
FIG. 1 is a schematic diagram of the process for creating and injecting foam into a well.

With reference to the figures, wherein like numerals represent like elements throughout the several views, method and apparatus for formation fracturing with foam having a greater proppant concentration are depicted. With reference to FIG. 1, a flow chart of a particular embodiment of the method according to the present invention is depicted. A tank 10 stores a foamable carrier which may be a liquid, a gel, a colloidal suspension, or the like. In the present example, the carrier is comprised of water thickened with a guar gum at a concentration of 2 to 2.5 lbs. per 100 gallons of water. For the purposes of this specification, all units will be United States units unless otherwise indicated. The water-guar gum solution forms a gel, the viscosity of which depends on the rate of shear. The gel is classified as a non-Newtonian fluid with a plastic viscosity ranging from 10 to 30 centipoise.

A suitable proppant is added to a blender 12 which takes a suction on tank 10. The presently preferable proppant is 40 to 60 screen sand. However, other proppants which can be used can include glass, plastics, and metal particles. The shape of the proppant particles can be spherical, ellipsoidal, or irregular. The output of the blender is a slurry which is then fed to a high pressure injection pump 14. The concentration of the proppant or sand is typically from 6 to 8 lbs. of sand per gallon of carrier. Pump 14 is a conventional pump and raises the pressure of the slurry to at least the required well head pressure.

The pressurized slurry is then fed into the input of a separator or concentrator 16 which increases the proppant-slurry ratio by "dehydrating" the slurry. Concentrator 16 segregates a fraction of the carrier and discharges it via a pressure reduction system 18 to a settling tank 20 which is at atmospheric pressure and from which it can be sent to a storage tank (not shown). The remaining fraction of the input to concentrator 16 is discharged therefrom as a concentrated slurry. As an example, the slurry from the discharge of concentrator 16 can have from 12 to 15 lbs. of proppant or sand per gallon of fluid.

Pressure reduction system 18 comprises a throttling valve system which must reduce the pressure of the carrier from a high level of from 2,000 to 6,000 psig to near atmospheric pressure. Although this large amount of pressure drop can present problems in valve wear and noise control, conventional commercial equipment is available for performing this function. An automatic, two stage valve system is disclosed in FIG. 1 and comprises a first reduction valve 22 and a second reduction valve 24 with an intermediate, manually operated throttling valve 26. It is preferable that the reduction and throttling valves have ceramic chokes. The discharge pressure of first reduction valve 22 is automatically controlled by signals generated by an upstream differential pressure transmitter 28 and a downstream differential pressure transmitter 30. An electrical output signal is generated by upstream transmitter 28 and is sent through a bias relay to a three-mode flow controller 32 which also receives the electrical output signal from transmitter 30 directly. An electrical signal from flow controller 32 operates a valve positioner 34 which in turn is mechanically coupled to first reduction valve 22. In addition, valve positioner 34 generates an electrical signal which is sent to a booster relay 36 which in turn is electrically coupled to first reduction valve 22 for providing a more rapid initial response of the valve. Second reduction valve 24 requires a much simpler control system. A differential pressure transmitter 38 generates an electrical signal which is coupled to a three-mode pressure controller 40. Pressure controller 40 generates a valve control signal which is fed to a valve positioner 42 that in turn is both electrically and mechanically coupled to second reduction valve 24 for the positioning thereof. Various pressure indicators 44 and a flow recorder 46 are used to monitor the operation of the pressure reduction system 18.

In order to reduce the surface tension of the concentrated slurry discharged from concentrator 16, a conventional surfactant is injected at a mixing junction 48 with a conventional, high pressure injection pump 50. The particular surfactant or surface active foaming agent utilized will, of course, depend upon the carrier and the type and character of the formation. Examples of conventional surfactants are disclosed in the Blauer et al patent referred to hereinabove. At a point downstream of surfactant mixing junction 48, a second mixing junction 52 is used for the introduction of the foam generating gas. The gases utilizable in the present invention include nitrogen, carbon dioxide, air, hydrocarbon gases, and the "inert" gases such as argon, helium, krypton and xenon. A large amount of gas at high pressure must be used for the production of foam, which is produced at the point where gas is added. The foam is then introduced into a well 54. Foam injection rates are approximately 4 to 5 times the volume of fluid supplied to pump 14.

Figure 2:
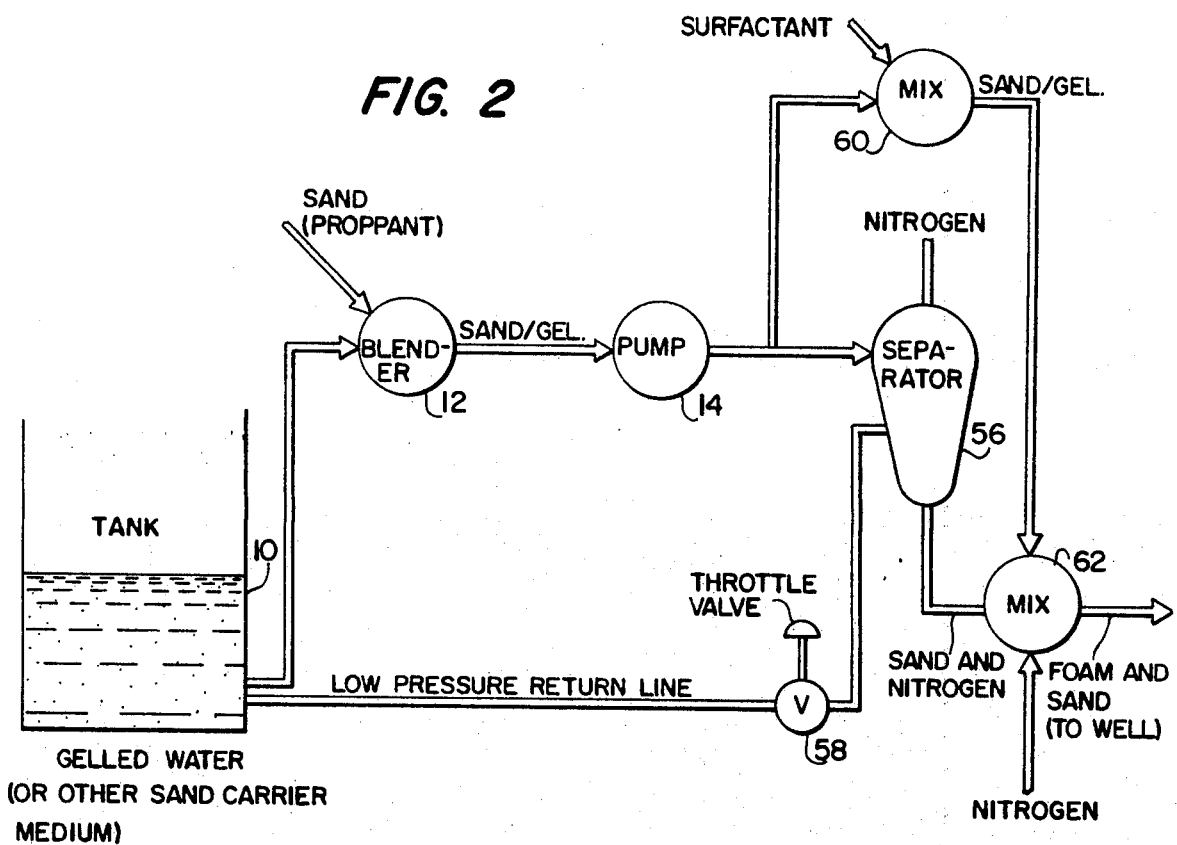
FIG. 2 is a schematic diagram of an alternative embodiment of a process for creating and injecting foam into a well.

In an alternative embodiment of the invention shown in FIG. 2, the high pressure slurry output from pump 14 is divided into two parts, a first part being fed to a conventional cyclone separator 56. A portion of the carrier is separated from the slurry in cyclone separator 56 and is discharged through a throttling valve 58 back to tank 10. The foaming gas, such as nitrogen, may be introduced into separator 56. The second part of the slurry bypasses separator 56 and is sent to a mixing junction 60 where surfactant is added. The surfactant-slurry mixture is then combined at a mixing juncture 62 with the concentrated slurry-nitrogen mixture discharged from separator 56. Additional nitrogen is added at mixing juncture 62 to yield the desired quality foam which is then piped into the well. The proppant concentration in the concentrated slurry is regulated by controlling the carrier recycling rate using throttling valve 58.

Figure 3:
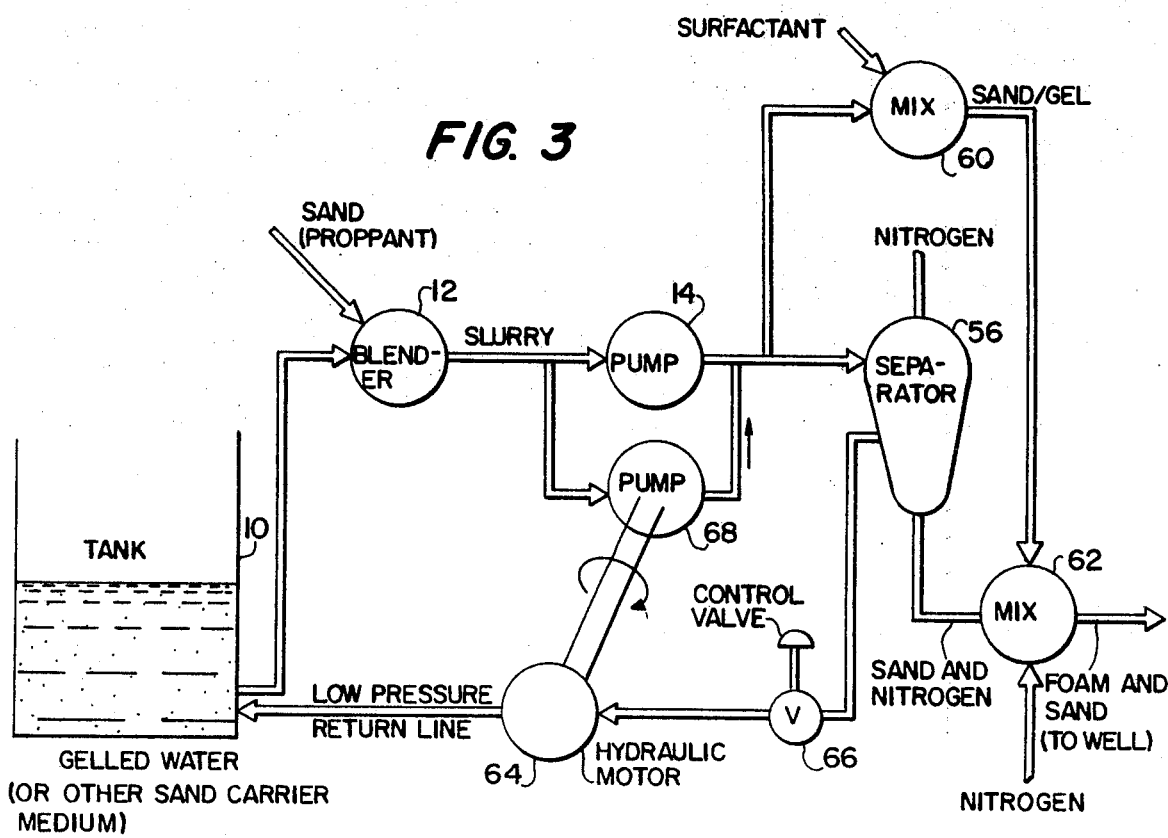
FIG. 3 is a schematic diagram of a third embodiment for creating and injecting foam into a well.
Figure 4:
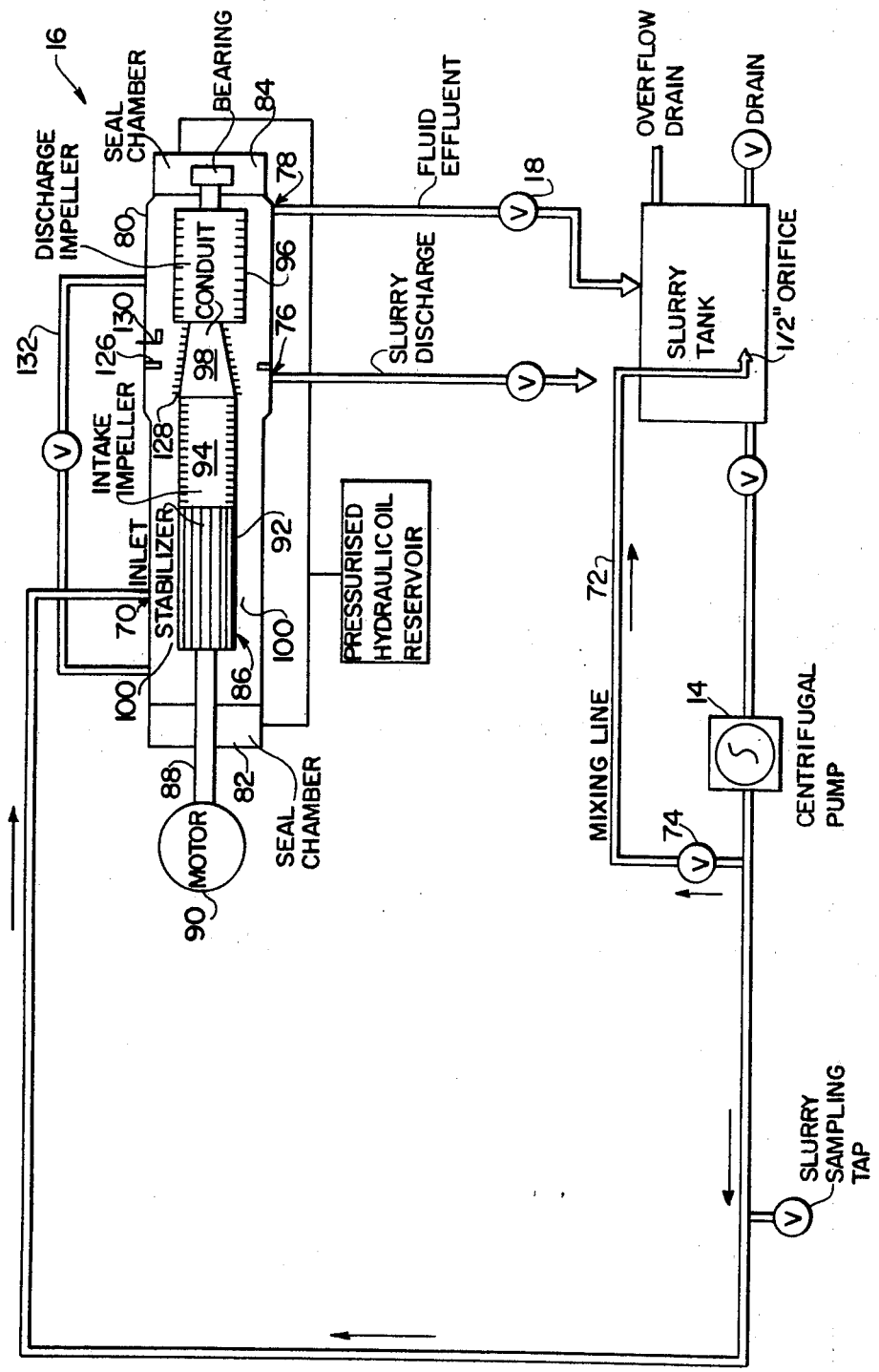
FIG. 4 is a schematic diagram of a separator or concentrator for increasing the concentration of proppant in the slurry prior to the foaming of the slurry.

A third embodiment of the present invention is shown in FIG. 3 wherein a hydraulic motor 64 is used to depressurize the recycled carrier. A manually operated control valve 66 can be used to control the concentration of the proppant in the slurry discharged from separator 56. One way of reducing the power requirement would be to have hydraulic motor 64 control a second injection pump 68 which is in parallel with the principal injection pump 14. The system disclosed in FIG. 3 is similar to that disclosed in FIG. 2 in all other respects.

It is noted that FIGS. 1, 2, and 3 depicted the surfactant as being added in the high pressure part of the system. However, if the injection pump and the concentrator are sufficiently gas free, the surfactant can be added in the low pressure side of the system. The only advantage of adding the surfactant on the high pressure side of the system downstream of the concentrator or separator is that foaming is prevented in the injection pump or in the concentrator or separator. Naturally, a high pressure injection pump must be used to inject the surfactant on the high pressure side which in turn adds to the cost of the system.

With reference now to FIGS. 4–8, a preferred concentrator according to the present invention is disclosed at 16. Concentrator 16 receives a high pressure slurry at an inlet 70 located at the forward end thereof from a slurry storage tank 10 through a high pressure injection pump 14. If desired, a mixing line 72 can be connected through a valve 74 to the discharge of pump 14 and supply a small quantity of slurry back to tank 10 to ensure that the proppant does not settle out of the carrier. Concentrated slurry is discharged from concentrator 16 at a slurry outlet 76. A substantially proppant free carrier is discharged from concentrator 16 at a carrier outlet 78.

Concentrator 16 is comprised of a substantially horizontally extending, substantially cylindrical vessel 80 having forward and rearward hydraulic seal chambers 82 and 84, respectively. A rotor 86 is rotatably mounted inside vessel 80 on a shaft 88 that is journalled inside seal chambers 82 and 84. A high torque developing motor 90 is connected to shaft 88 for rotating rotor 86 at operating speeds which can be from 1600 to 2000 r.p.m. Rotor 86 in turn comprises a substantially cyclindrical stabilizer 92 at the forward end thereof, a plurality of intake impellers 94 downstream of stabilizer 92, a plurality of discharge impellers 96 spaced downstream from intake impellers 94 and an internal passageway 98 in fluid communication from intake impellers 94 to discharge impellers 96. Rotor 86 and the circular walls of vessel 80 define an annular concentric channel 100, through which the concentrated slurry is accumulated and into which slurry outlet 76 is tangentially connected.

Stabilizer 92 has two basic functions, to impart a spin to the incoming slurry through frictional contact and to dampen torsional vibrations of the rotor and shaft by the frictional torque exerted by the rotor. Stabilizer 92 preferably has a rubber cover to resist abrasion and a plurality of longitudinal or axial grooves therein to increase surface area and improve traction. The spin induced by stabilizer 92 develops sufficient centrifugal force on the proppant in the slurry to initiate the proppant separation process before the slurry reaches the intake impellers 94. This provides a boundary layer of carrier largely free of proppant and helps to protect the intake impellers from contact with an excessive quantity of the abrasive proppant.

Figure 5:
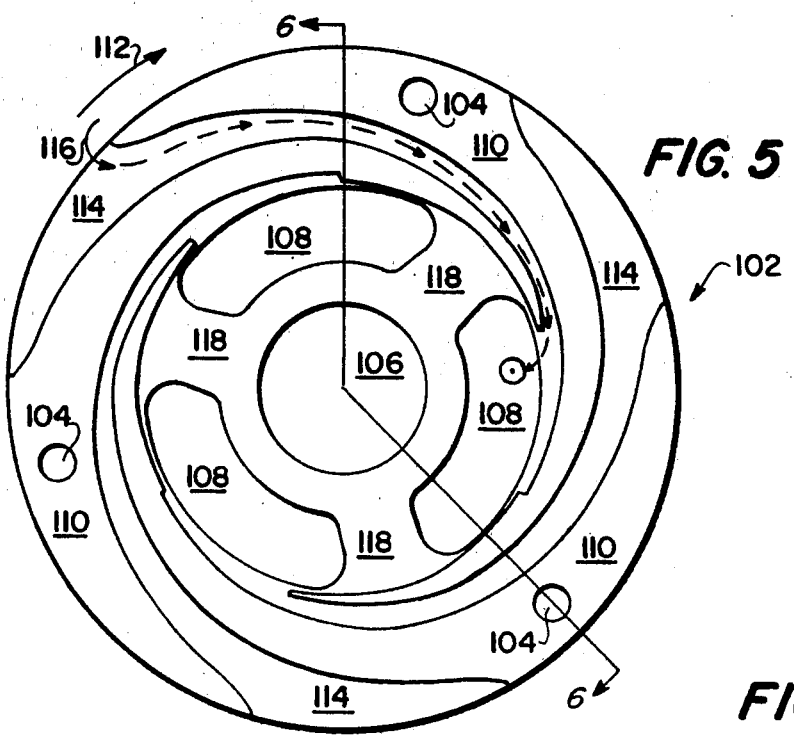
FIG. 5 is a front elevational view of an intake impeller on the rotor of the concentrator depicted in FIG. 4.
Figure 6:
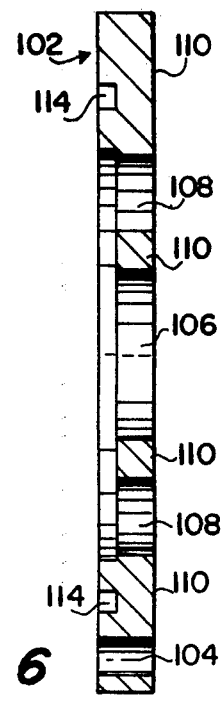
FIG. 6 is a cross-sectional view taken along line 6—6 of FIG. 5.
Figure 1:
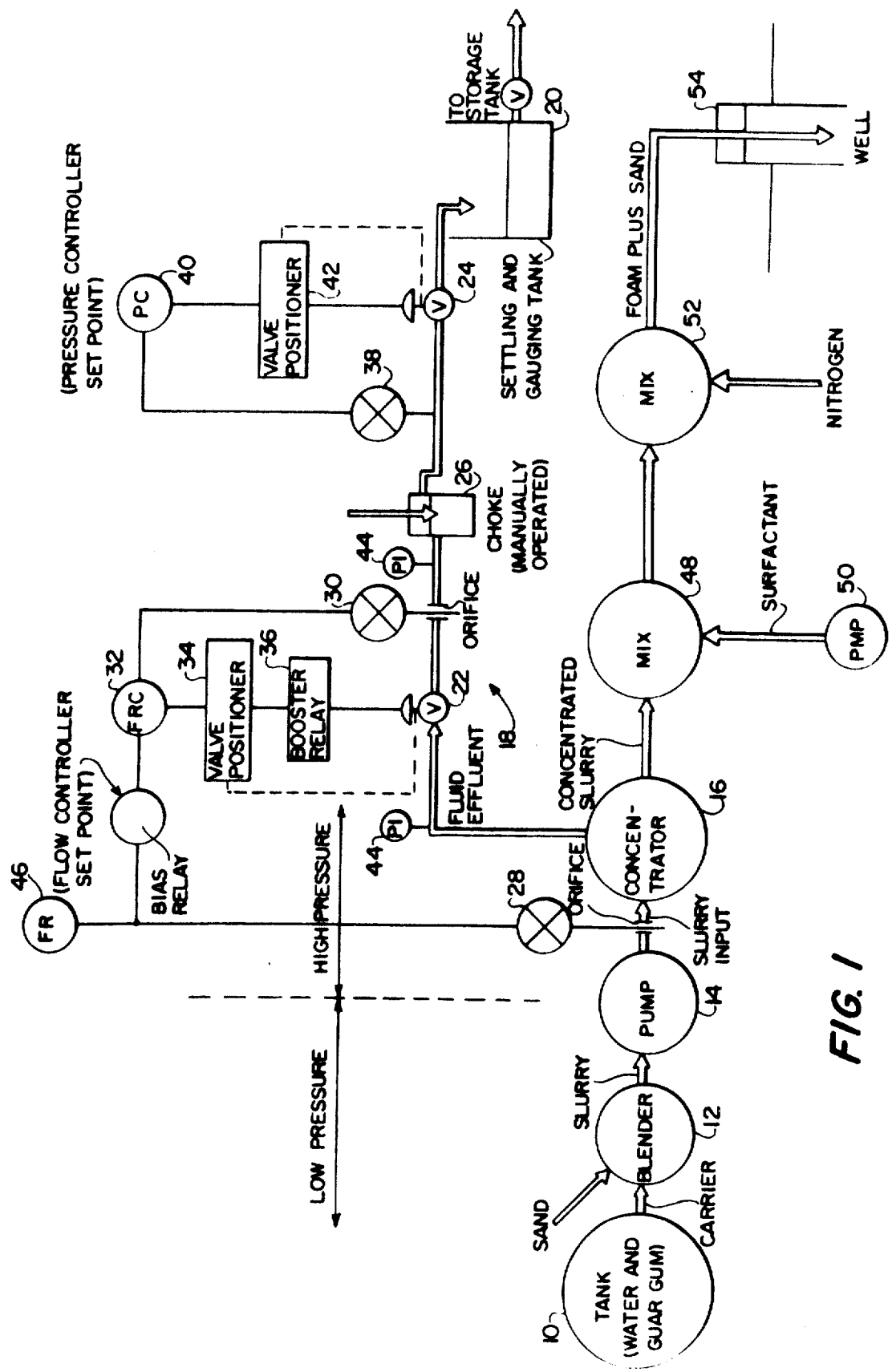
Figure 2:
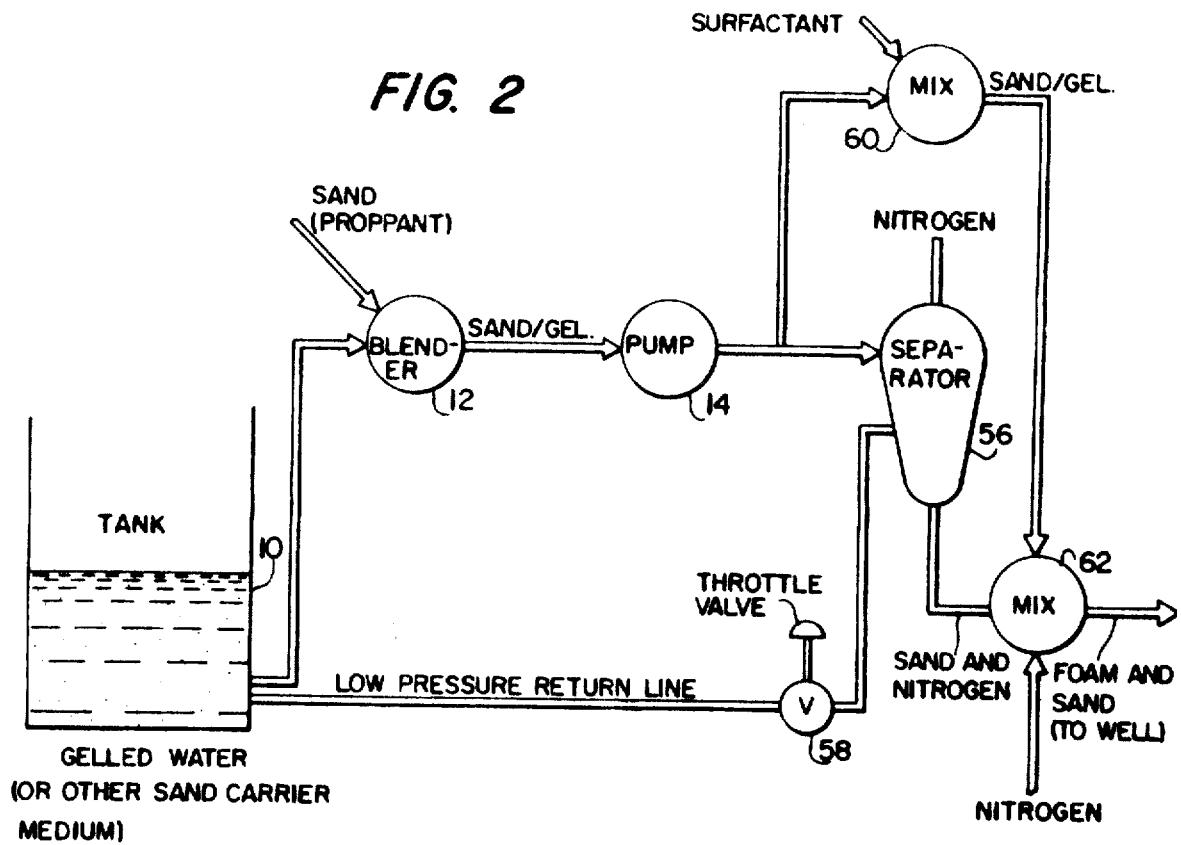
Figure 3:
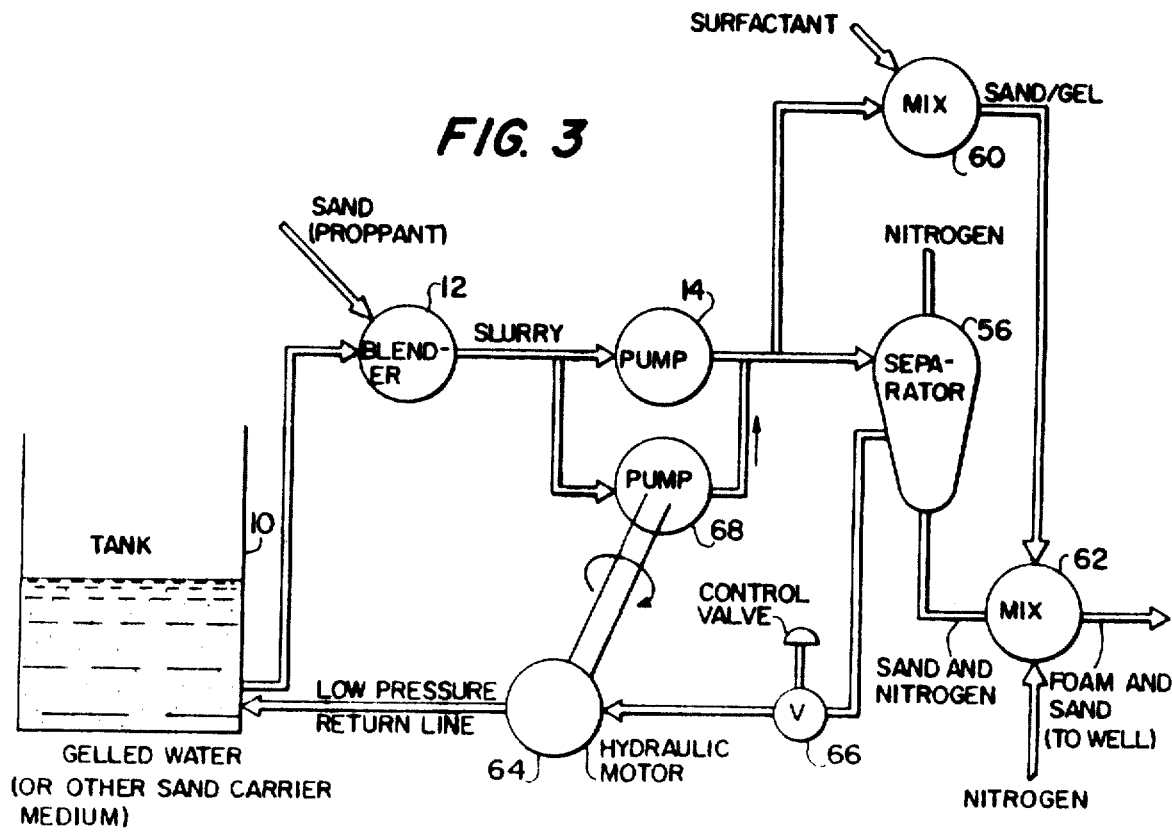
Figure 4:
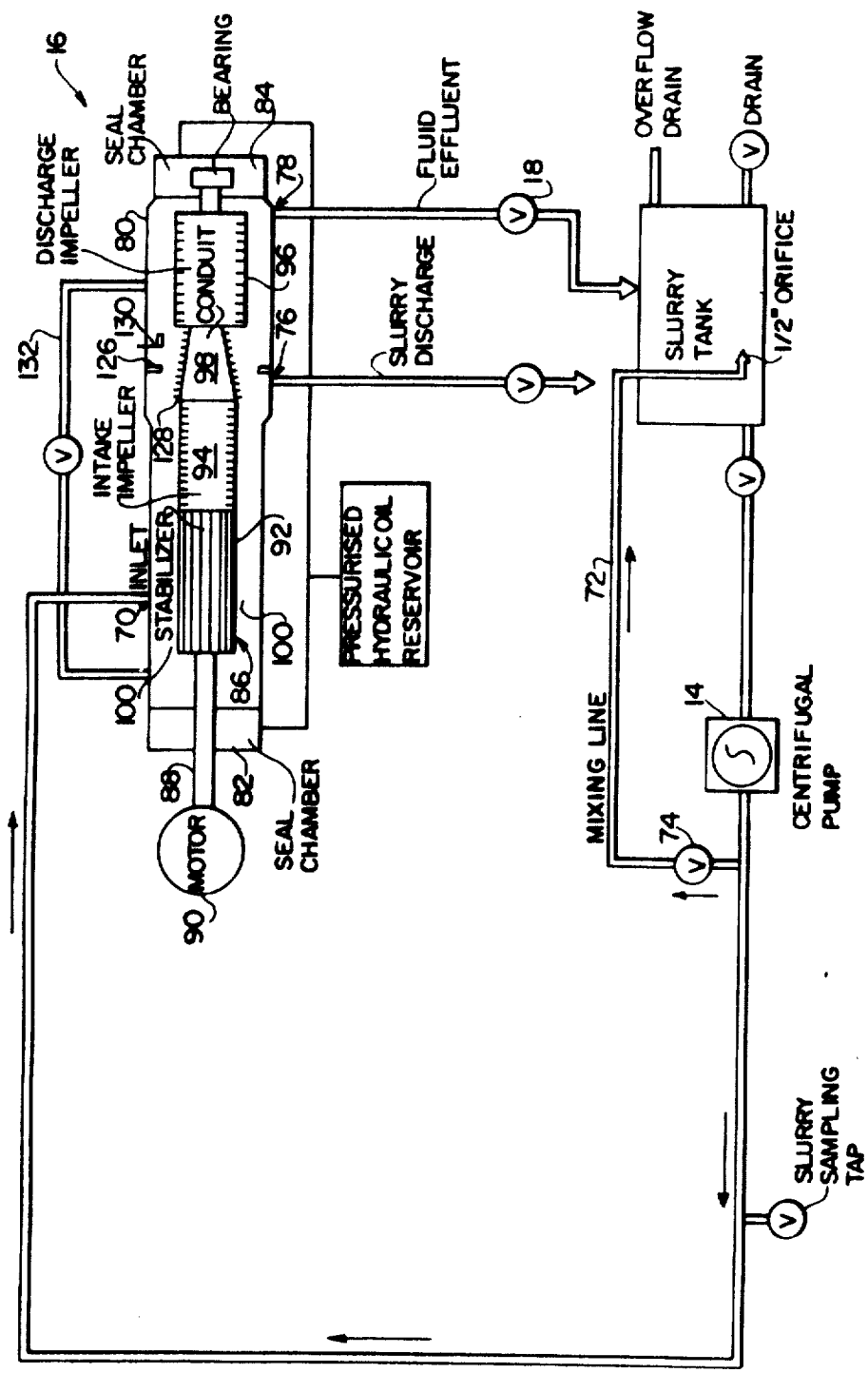

Intake impellers 94 consist of a plurality (for example 15) of individual impellers 102 which can be of the type shown in FIGS. 5 and 6. Each impeller 102 has a plurality of axially extending orifices 104 spaced about the outer part of the circumference thereof. Orifices 104 receive stabilizing rods (not shown) which extend through all of the individual impellers and thereby permit all of the impellers 102 to rotate together. A large, central orifice 106 in impeller 102 permits the impeller to be mounted onto shaft 88. A plurality of inner orifices 108 shaped as circle segments and circumferentially spaced about central orifice 106 extend completely through impeller 102 and provide an axial fluid course or channel for the separated carrier. The size of the inner orifices 108 must be sufficient to handle the required volume of effluent carrier flow at reasonable fluid velocities. A plurality of spaced apart vanes 110, preferably equal in number to the number of inner orifices 108 spiral outwardly from the outer periphery of inner orifices 108 in a direction opposite the direction of rotation indicated by arrow 112 to the outer periphery of impeller 102. Vanes 110 define a plurality of shallow (e.g., ¼ inch), outwardly spiralling intake channels 114 for permitting a fraction of the intake slurry to be admitted therein. Intake channels 114 spiral in a direction opposite the rotation of impeller 102 so as to discourage the admission of proppant. On the one hand, intake channels cannot be so small a to get plugged with fine or course proppant, yet on the other hand must have a small enough cross section so as to guide the slurry effectively. The total cross sectional area of all of intake channels 114 in all of impellers 102 must also be appropriately sized for the rated flow therethrough and hence the flow through concentrator 16. The flow through intake channels 114 is indicated by dashed line 116. Finally, a plurality of spokes 118 emanate radially outwardly from central orifice 106 to vanes 110 and function not only as supporting members for impeller 102, but also for providing increased fluid traction and the torque supplied to the fluid contributes to the rotational strength of the fluid vortex system.

Figure 7:
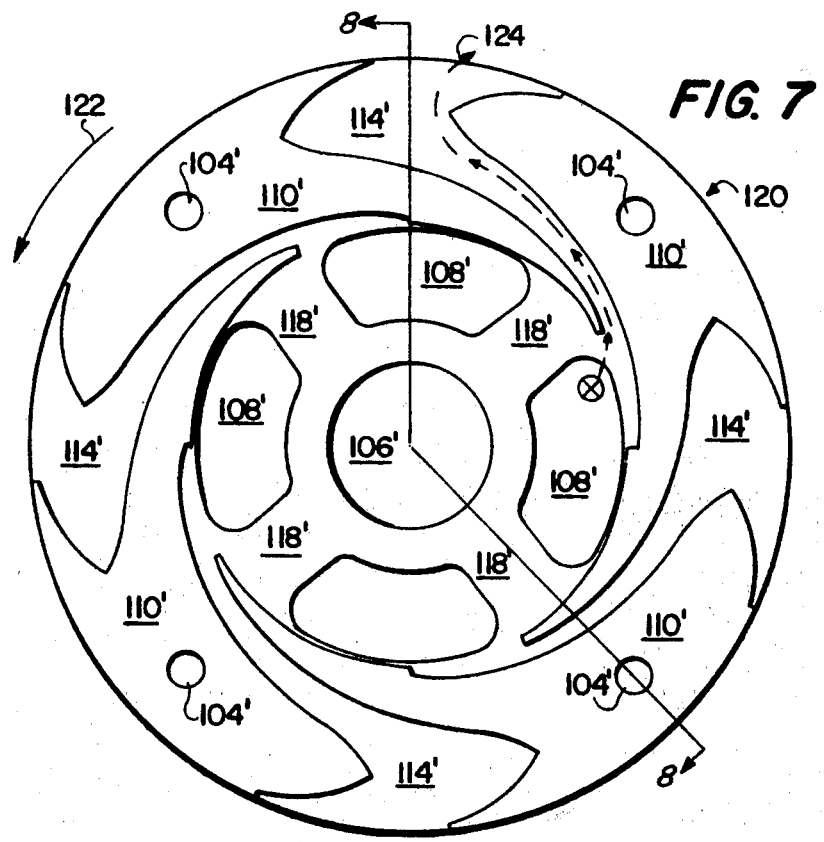
FIG. 7 is a front elevational view of a discharge impeller on the rotor of the concentrator depicted in FIG. 4.
Figure 8:
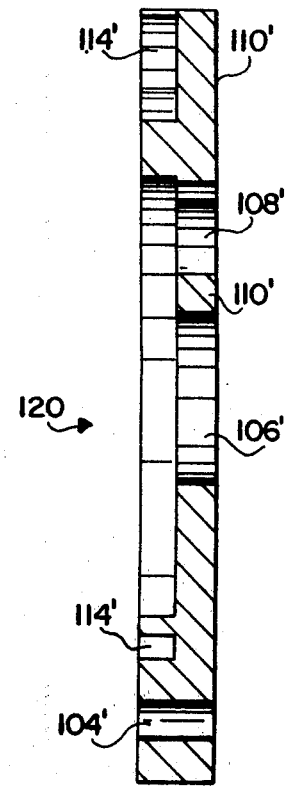
FIG. 8 is a cross-sectional view taken along line 8—8 of FIG. 7.

Discharge impellers 96 comprise a plurality of individual impellers 120 as shown in FIGS. 7 and 8. Impeller 120 is comprised of the same elements as intake impeller 102, albeit different in number and shape, and are denoted by the primed number that is the same as the corresponding element in the intake impeller 102. Discharge impeller 120 rotates in the direction shown by arrow 122 and has a fluid flow outwardly as shown by arrow 124. Discharge impeller 120 also differs from intake impeller 102 in that the former has a larger diameter so as to provide the required discharge head. Exemplary diameters of intake and discharge impellers 102 and 120 are 4½ inches and 5 inches, respectively, each with a nominal thickness of ½ inch and each with fluid passages or channels of ¼ inch in depth. The impeller faces can be molded from epoxy with the mating faces of adjacent impellers ground true. An exemplary number of discharge impellers 120 can be 14 or 15.

It may also be desirable to locate a small propeller at the upstream end of intake impellers 94 so as to provide axial thrust. In addition, a rubber annular restrictor 126 can be located immediately downstream of the slurry outlet 76 so as to form an orifice and thereby restrict axial flow to a small annular space around rotor 86. By restricting the axial flow area beyond slurry outlet 76, the wash of fluid from discharge impellers 96 should be sufficient to check the axial momentum of proppant and thereby limit the amount of proppant discharged with the carrier. A plurality of deflector fins 128 mounted between intake impellers 94 and discharge impellers 96 are perforated and are to impart additional spin to the concentrated slurry at the discharge and check the axial momentum of the proppant. An axial vane 130, pivotally mounted with a shaft extending through the wall of vessel 80, is located in the annular space just downstream of slurry discharge or outlet 76 and is useful for controlling the volume of carrier washing past restrictor 126 from discharge impellers 96.

Concentrator 16 also has a valved recycle line 132 tangentially entering vessel 80 opposite discharge impellers 96 at one end and upstream of stabilizer 92 at the other end. Recycle line 132 provides a means for washing axial channel 100 with an increased volume of flow to prevent plugging thereof with solids.

Concentrator 16 can be equipped with adjustable legs at the motor 90 end thereof so that it can be inclined at the forward end. Exemplary specifications of concentrator 16 can include a working pressure of 5,000 psig, a maximum input slurry rate of 210 gpm having an input concentration of 4 to 8 lbs. per gallon. An output concentration of proppant in the concentrated slurry can be expected to be greater than 12 lbs. per gallon.

In operation, concentrator 16 has slurry fed into inlet 70 which preferably is tangentially connected. The pressure inside concentrator 16 is maintained by controlling the input and output fluids. A fraction of the input slurry is induced to flow radially inwardly entering intake impeller 94 through intake channels 114. The fluid within the rotor is induced to flow axially along and through inner orifices 108 toward discharge impellers 96. Fluid flows out of discharge impellers 96 through discharge channels 114' into a rearward part of annular channel 100. As the fluid is flowing through inner orifices 108, any proppant still therein is forced radially outwardly back into axial channel or annulus 100. Slurry at a concentration increased by the withdrawal of carrier flows axially along axial channel 100 toward slurry outlet 76. Deflector fins 128 increase the angular velocity of the concentrated slurry in the vicinity of slurry outlet 76 and particles of the proppant impinging on the deflector fins lose axial momentum. Flexible restrictor 126 also serves as a guide to deflect proppant toward slurry outlet 76. A fraction of the flow from discharge impellers 96 is removed as carrier effluent and the residual flow from discharge impellers 96 washes back to slurry outlet 76 where it is discharged with the concentrated slurry.

Although the method and apparatus of the present invention have been described in detail with respect to exemplary embodiments thereof, it will be understood by those of ordinary skill in the art that variations and modifications may be effected within the scope and spirit of the invention.

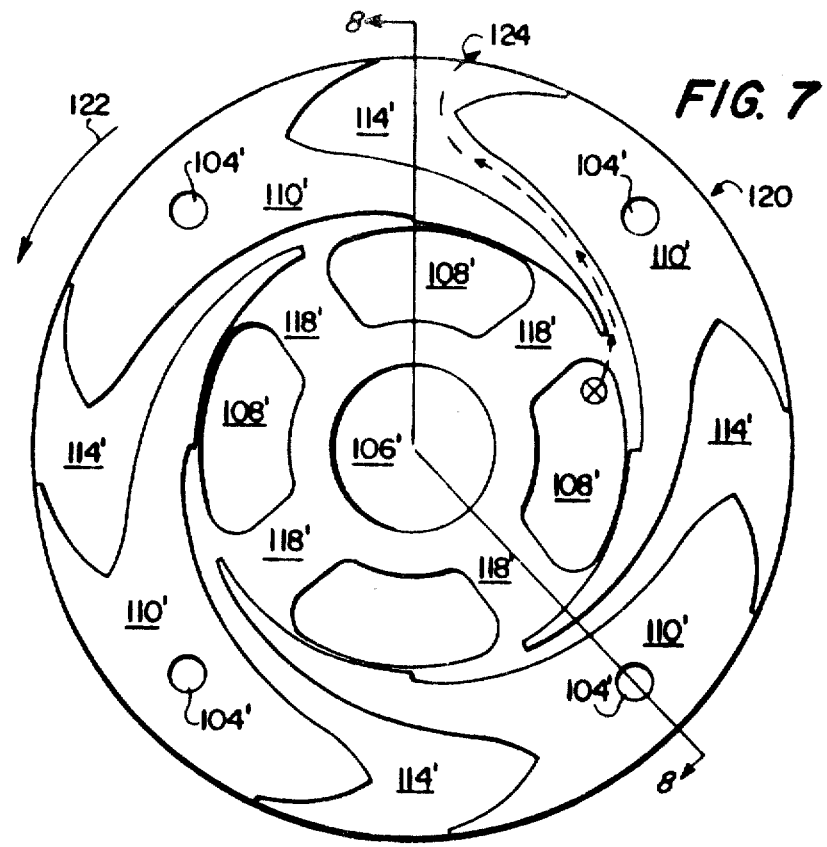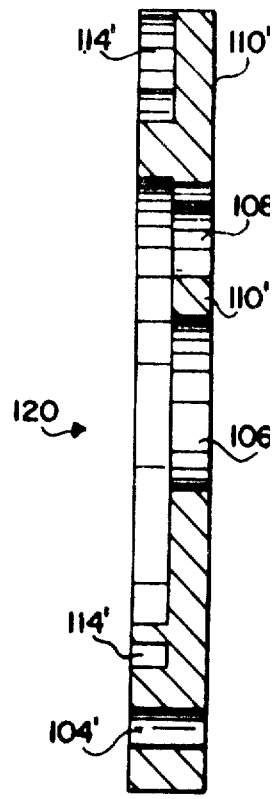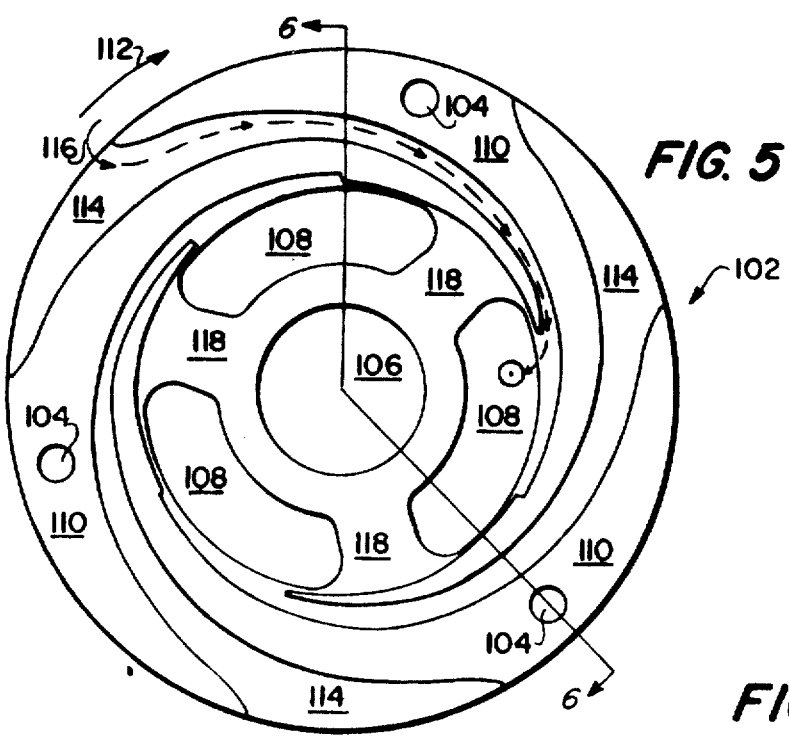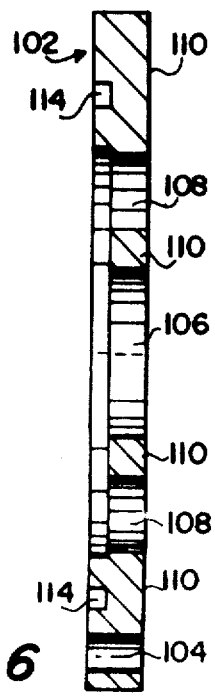

I claim:

1. A method of treating a subsurface earth formation penetrated by a well bore with a foam comprising the steps of:

blending a proppant with a foamable carrier thereby forming a slurry;

pressurizing the slurry to a desired pressure;

introducing the pressurized slurry into a centrifugal separator which can separate out some of the carrier thereby concentrating the amount of proppant per volume of slurry;

removing an amount of the carrier from the separator per volume of slurry until the desired proppant concentration is obtained in the concentrated slurry;

discharging the concentrated slurry from the separator;

adding a surfactant to the slurry either prior to or after pressurizing said slurry and at a stage prior to the formation of foam;

adding a pressurized gas to the discharged concentrated slurry, thereby forming a pressurized foam; and injecting said pressurized foam into the well bore.

2. The method of claim 1 wherein said surfactant is added to the pressurized slurry.

3. The method of claim 1 wherein said surfactant is added to the unpressurized slurry.

4. The method of claim 1 wherein said carrier comprises water plus guar gum.

5. The method of claim 4 wherein said proppant is sand.

6. The method of claim 1 and further including drawing off some of the pressurized slurry before the slurry is concentrated; mixing the drawn off slurry with surfactant; and combining the mixture with the concentrated slurry.

7. The method of claim 6 wherein foaming gas is added to the concentrated slurry before combination thereof with said drawn off slurry.

8. A method for producing a foam for treating a subsurface earth formation penetrated by a well bore comprising the steps of:
blending a proppant with a foamable carrier which comprises a liquid, thereby forming a slurry;
pressurizing the slurry to a pressure that is great enough for introduction into the well bore;
introducing the pressurized slurry into a centrifugal, mechanical separator of the type that can concentrate the amount of proppant in the carrier by removing some of the liquid;
discharging the concentrated slurry from the separator and removing an amount of substantially proppant free liquid from the separator to get the desired proppant concentration in the slurry;
adding a surfactant to the mixture at a stage prior to the formation of foam; and
adding a pressurized gas to the concentrated slurry to form the pressurized foam.

9. The method of claim 8 wherein said slurry is concentrated in a substantially horizontally extending separator having an internal rotor, said rotor comprising intake impellers, discharge impellers, and an internal passageway connecting said intake and discharge impellers and said rotor defining a concentric channel between the outer separator walls and the rotor, said concentration being accomplished by imparting a spin to the slurry as the slurry is introduced into said separator; transmitting a fraction of the spinning slurry radially inwardly into said internal passageway with said intake impellers, transmitting the remainder of the slurry axially through said concentric channel to a discharge point; removing substantially all of the proppant from said fraction of slurry to said channel thereby concentrating said axially transmitted slurry and producing a substantially proppant free carrier; discharging said concentrated slurry from said separator at a rate so as to control the pressure inside said separator; and discharging said carrier from said separator at a rate so as to control the proppant concentration of said concentrated slurry.

10. A system for treating a subsurface earth formation penetrated by a well bore with a foam comprising:
means for blending a proppant with a foamable carrier so as to form a slurry;
means connected to said blending means for pressurizing the slurry to a desired pressure;
a centrifugal separator connected to the discharge of the pressurizing means, said separator being capable of separating out some of the carrier thereby concentrating the amount of proppant per volume of slurry, of discharging an amount of the carrier per volume of slurry until the desired proppant concentration is obtained in the concentrated slurry, and of discharging the concentrated slurry;
means for adding a surfactant to the mixture at a stage prior to the formation of foam;
means for adding a pressurized gas to the discharged concentrated slurry, thereby forming a pressurized foam; and
means for injecting said pressurized foam into the well bore.

11. The system as claimed in claim 10 wherein said surfactant adding means is connected to the discharge of said pressurizing means.

12. The system as claimed in claim 10 wherein said surfactant adding means is connected upstream of said pressurizing means.

13. The system as claimed in claim 10 wherein said carrier comprises water plus guar gum.

14. The system as claimed in claim 13 wherein said proppant is sand.

15. The system as claimed in claim 10 and further including means for drawing off some of the pressurized slurry before the slurry is concentrated; means for mixing the drawn off slurry with surfactant; and means for combining the mixture with the concentrated slurry.

16. The system as claimed in claim 15 wherein said gas adding means is connected between said separator and said combining means such that said foaming gas is added to the concentrated slurry before combination thereof with said drawn off slurry.

17. A system for producing a foam for treating a subsurface earth formation penetrated by a well bore comprising:
means for blending a proppant with a foamable carrier which comprises a liquid, thereby forming a slurry;
means connected to said blending means for pressurizing the slurry to a pressure that is great enough for introduction into the well bore;
a centrifugal, mechanical separator of the type that can concentrate the amount of proppant in the carrier by removing some of the liquid, the intake of said separator connected to the discharge of said pressurizing means, said separator removing an amount of substantially proppant free liquid to get the desired proppant concentration in the slurry and discharging the concentrated slurry;
means for adding a surfactant to the mixture at a stage prior to the formation of foam; and
means for adding a pressurized gas to the concentrated slurry to form the pressurized foam.

18. The system as claimed in claim 17 wherein said separator comprises a substantially horizontally extending vessel, an internal rotor, said rotor comprising intake impellers, discharge impellers, and an internal passageway connecting said intake and discharge impellers and said rotor defining a concentric channel between the outer separator walls and the rotor, said concentration being accomplished by imparting a spin to the slurry as the slurry is introduced into said separator; transmitting a fraction of the spinning slurry radially inwardly into said internal passageway with said intake impellers, transmitting the remainder of the slurry axially through said concentric channel to a discharge point; removing substantially all of the proppant from said fraction of slurry to said channel thereby concentrating said axially transmitted slurry and producing a substantially proppant free carrier; discharging said concentrated slurry from said separator at a rate so as to control the pressure inside said separator; and discharging said carrier from said separator at a rate so as to control the proppant concentration of said concentrated slurry.

* * * * *

UNITED STATES PATENT AND TRADEMARK OFFICE
CERTIFICATE OF CORRECTION

PATENT NO. : 4,126,181

DATED : November 21, 1978

INVENTOR(S) : Donald S. Black

It is certified that error appears in the above–identified patent and that said Letters Patent are hereby corrected as shown below:

Delete the drawings figures 1-10 and substitute the drawing figures 1-8 as shown on the attached sheets.

This certificate applys to the Grant, exclusively.

Signed and Sealed this

Seventeenth Day of April 1979

[SEAL]

Attest:

RUTH C. MASON
Attesting Officer

DONALD W. BANNER
Commissioner of Patents and Trademarks